United States Patent
Oh et al.

(12)

(10) Patent No.: US 6,214,953 B1
(45) Date of Patent: Apr. 10, 2001

(54) PROCESS FOR THE PREPARATION OF OLEFINIC POLYMERS USING SUPPORTED METALLOCENE CATALYST

(75) Inventors: Jae-Seung Oh; Tai-Ho Park; Bun-Yeoul Lee, all of Daejeon (KR)

(73) Assignee: LG Chemical Limited (KR)

( * ) Notice: Subject to any disclaimer, the term of this patent is extended or adjusted under 35 U.S.C. 154(b) by 0 days.

(21) Appl. No.: 09/230,935

(22) PCT Filed: Aug. 4, 1997

(86) PCT No.: PCT/KR97/00148

§ 371 Date: Feb. 3, 1999

§ 102(e) Date: Feb. 3, 1999

(87) PCT Pub. No.: WO98/21248

PCT Pub. Date: May 22, 1998

(30) Foreign Application Priority Data

Aug. 3, 1996 (KR) .................................................. 96/32497

(51) Int. Cl.⁷ ....................................................... C08F 4/42
(52) U.S. Cl. .......................... 526/160; 526/129; 526/348; 526/904; 526/943; 502/152
(58) Field of Search ................................... 526/129, 160, 526/348, 904, 943; 502/152

(56) References Cited

U.S. PATENT DOCUMENTS

| 4,808,561 | * | 2/1989 | Welborn, Jr. | .......................... | 502/104 |
| 5,296,565 | * | 3/1994 | Ueda et al. | .......................... | 526/114 |
| 5,599,885 | * | 2/1997 | Welborn, Jr. | .......................... | 526/68 |

FOREIGN PATENT DOCUMENTS 0 519 236 * 2/1996 (EP) .

\* cited by examiner

Primary Examiner—David W. Wu
Assistant Examiner—Ling-Siu Choi
(74) Attorney, Agent, or Firm—Anderson Kill & Olick, PC

(57) ABSTRACT

An olefinic polymer having improved molecular weight distribution and bulk density is prepared by polymerizing an olefinic monomer and, optionally, a comonomer in the presence of a supported catalyst comprising a modified metallocene and an alkylaluminoxane supported on a carrier in an aliphatic hydrocarbon solvent, the modified metallocene being derived from a metallocene of formula(I) by introducing at least one $C_{5-20}$ alkyl substituent into a π-ligand, $C_{1-4}$ alkylene bridge or silicon bridge thereof and the alkylaluminoxane having a repeating unit of formula(II):

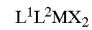

(I)

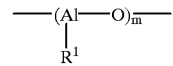

(II)

wherein:

M is Ti, Zr or Hf;

X is a halogen, or a $C_{1-3}$ alkyl group;

$L^1$ and $L^2$ are each a π-ligand selected from the group consisting of cyclopentadienyl, indenyl, fluorenyl and derivatives thereof, and are optionally linked together by a $C_{1-4}$ alkylene bridge or by a silicon bridge;

m is an integer of 2 or more; and $R^1$ is a $C_{1-20}$ alkyl group.

8 Claims, No Drawings

PROCESS FOR THE PREPARATION OF OLEFINIC POLYMERS USING SUPPORTED METALLOCENE CATALYST

FIELD OF THE INVENTION

The present invention relates to an improved method for preparing an olefinic polymer having improved properties by polymerizing an olefinic monomer using a supported metallocene catalyst prepared by contacting a metallocene catalyst with a supported cocatalyst on a carrier in an aliphatic hydrocarbon solvent.

DESCRIPTION OF THE PRIOR ART

A metallocene compound refers to a transition metal complex having coordinated cyclopentadienyl ligands. Many studies on various catalysts based on metallocene compounds have been carried out since Kaminsky and Sinn reported that a metallocene compound, when used together with a condensation product of water and methylaluminum (e.g., methylaluminoxane, MAO), exhibits a high catalytic activity in olefin polymerization[H. Sinn and W. Kaminsky, *Adv. Organomet. Chem.*, 18, 99 (1980); and H. Sinn, W. Kaminsky, H. J. Vollmer and R. Woldt, *Angew. Chem.*, 92, 396 (1980)]. Such studies have shown that many metallocene catalysts exhibit high activities in polymerizing olefins, diolefins, styrenes and others(see, e.g., WO 91/14713).

When a metallocene catalyst is used in olefin polymerization, the structure and properties of the polymer produced can be better controlled than when a conventional Ziegler-Natta catalyst is used together with an alkylaluminum compound as a cocatalyst. For example, the molecular weight distribution of the polymer becomes narrower, and when used in a copolymerization, the distribution of the comonomer in the copolymer is much more uniform.

However, one drawback of metallocene catalysts is that although they readily dissolve in aromatic hydrocarbons such as benzene, toluene and substituted benzene, they are almost insoluble in aliphatic hydrocarbons. Bisindenyl zirconium dimethyl, for example, is completely soluble in toluene whereas it does not dissolve in heptane; and this difference in solubility is reflected on its catalytic activity, i.e., its catalytic activity in toluene is greater than that in heptane by a factor of 7 or more (see *J. Polym. Sci; Polym. Chem. Ed.*, 123, 2117 (1985)). Because the use of an aromatic hydrocarbon solvent in a polymerization process is not advantageous due to its toxicity and unfavorable process economics in recovering the high-boiling point aromatic solvent, it is desirable to develop an efficient polyolefin manufacturing process using a metallocene catalyst in an aliphatic hydrocarbon solvent. Accordingly, there exists a need to develop a new metallocene catalyst that exhibits a high activity in an aliphatic hydrocarbon solvent.

On the other hand, when a homogeneous, i.e., solution, catalyst, which is not supported on a carrier, is used in preparing an olefinic polymer in either an aromatic or aliphatic hydrocarbon solvent, the productivity is generally low and it is difficult to separate and recover the polymer product, in addition to other problems, e.g., bulk density of the polymer produced is very low, the size of the polymer is not uniform, and reactor fouling may also occur. Accordingly, many attempts have been made to alleviate such problems by using a heterogeneous catalyst: a catalyst as well as a cocatalyst supported on a solid carrier is used (see W. Kaminsky and F. Renner, *Macromol. Chem., Rapid Commun.*, 14, 239 (1993); and K. Soga and M. Kaminaka, *Macromol. Chem., Rapid Commun.*, 194, 1745 (1993); a supported catalyst is prepared using a solid support having on its surface a controlled number of hydroxy groups or hydroxy groups modified by various substituents (see K. Soga and M. Kaminaka, *Macromol. Chem., Rapid Commun.*, 194, 1745 (1993); and S. Collins, W. Mark Kelly and David A. Holder, *Macromolecules.* 25, 1780–1785 (1992)); reactive sites are introduced on the ligand of a metallocene catalyst and the ligand is reacted with an olefin by conducting a prepolymerization reaction to anchor the metallocene catalyst within a polymer matrix, or the reactive sites having olefinic moiety on the ligand of a metallocene catalyst are polymerized to obtain a catalyst cluster(see U.S. Pat. Nos. 5,262,498 and 5,308,817); and a solid catalyst is prepared by contacting a zirconocene catalyst with methylaluminoxane in an aromatic solvent, adding silica in an aromatic solvent thereto, washing and drying the resulting catalyst several times in order to remove the unreacted metallocene catalyst, and conducting prepolymerization to obtain a solid catalyst (see U.S. Pat. No. 5,240,894).

However, these methods have problems associated with reduced efficiency and increased ash content. Specifically, a supported metallocene catalyst introduces a relatively large amount of the support material to the polymer product, and the metallocene catalyst may be deactivated by the reaction with hydroxy groups, which are catalyst poison, present on the surface of the carrier. Furthermore, when a metallocene is dissolved in an aromatic hydrocarbon solvent and contacted with an MAO to prepare a catalyst, or when a metallocene and an MAO are introduced to a slurry of a carrier in an aromatic solvent to prepare a supported catalyst, the aromatic solvent must be removed thoroughly by employing multiple washing steps or by drying under a vacuum. If the removal of the aromatic hydrocarbon solvent is not complete, the metallocene catalyst remaining dissolved in the solvent may induce homogeneous polymerization, thereby causing the broadening of the molecular weight distribution, and causing reactor fouling and non-uniform particle size. Therefore, the above methods are not conducive to the preparation of a supported metallocene catalyst which can produce a polyolefin having a high bulk density and a homogeneous particle size distribution, while preventing the reactor fouling problem and maintaining the high catalyst activity.

SUMMARY OF THE INVENTION

Accordingly, it is an object of the present invention to provide a method for the preparation of an olefinic polymer having a narrow molecular weight distribution and a high bulk density by way of using a supported metallocene catalyst prepared in an aliphatic hydrocarbon solvent.

In accordance with one aspect of the present invention, there is provided a method for preparing an olefinic polymer having improved properties in molecular weight distribution and bulk density by polymerizing an olefinic monomer and, optionally, a comonomer in the presence of a supported catalyst comprising a modified metallocene and an alkylaluminoxane supported on a carrier, the modified metallocene being derived from a metallocene of formula (I) by introducing at least one $C_{5-20}$ alkyl substituent into a π-ligand, $C_{1-4}$ alkylene bridge or silicon bridge thereof and the alkylaluminoxane having a repeating unit of formula (II):

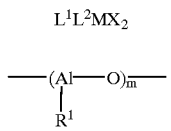   (I)

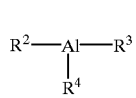   (II)

wherein:
M is Ti, Zr or Hf;
X is a halogen, or a $C_{1-3}$ alkyl group;
$L^1$ and $L^2$ are each a π-ligand selected from the group consisting of cyclopentadienyl, indenyl, fluorenyl and derivatives thereof, and are optionally linked together by a $C_{1-4}$ alkylene bridge or by a silicon bridge;
m is an integer of 2 or more; and
$R^1$ is a $C_{1-20}$ alkyl group.

DETAILED DESCRIPTION OF THE INVENTION

The supported catalyst of the present invention may be prepared by contacting a modified metallocene, wherein at least one $C_{5-20}$ alkyl substituent is introduced into the π-ligand, the alkylene bridge or silicon bridge of the metallocene catalyst of formula (I), with an alkylaluminoxane having a repeating unit of formula (II) supported on a carrier, and optionally with an alkylaluminum of formula (III), in an aliphatic hydrocarbon solvent to provide a supported catalyst, and optionally subjecting said supported catalyst to a prepolymerization reaction of an olefinic monomer:

$$R^2\text{---Al---}R^3$$
$$|$$
$$R^4$$   (III)

wherein $R^2$, $R^3$ and $R^4$ are each a $C_{1-20}$ alkyl group or a halogen.

One preferred embodiment of the process for preparing the supported catalyst of the present invention is as follows:

A metallocene catalyst is contacted with a supported alkylaluminoxane in an aliphatic hydrocarbon solvent to obtain a slurry containing the supported catalyst of the present invention and ethylene is optionally added to the slurry to conduct prepolymerization. Then the supported metallocene catalyst is optionally isolated from the slurry or the prepolymerization mixture. The above method for preparing the metallocene supported catalyst of the present invention does not include washing or drying step. The isolation of the supported metallocene catalyst may be carried out by decanting or filtering the slurry or the prepolymerization mixture.

The activity of the supported catalyst thus produced can be maintained during a long term storage. Further, the metallocene in the supported catalyst does not dissociate from the surface of the carrier even after a long term storage in the form of a slurry, and thus, it does not induce homogeneous polymerization to any significant extent. Alkylaluminum may be additionally used when a metallocene catalyst is contacted with a supported cocatalyst in an aliphatic hydrocarbon solvent.

The metallocene catalyst that may be used in practicing the present invention is a metallocene compound having one or more $C_{5-20}$ alkyl substituents in the ligand moiety or in the bridge between ligands. Examples of particularly preferred catalysts of the present invention are the compounds of formula (IV) to (XII):

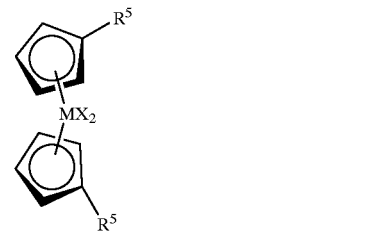   (IV)

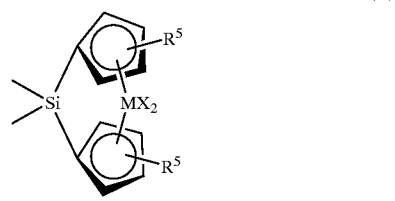   (V)

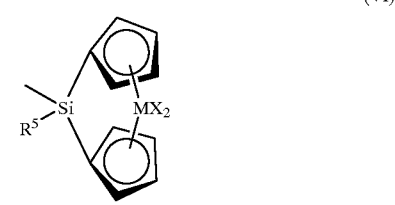   (VI)

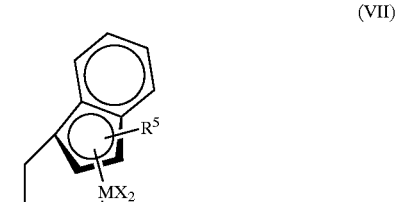   (VII)

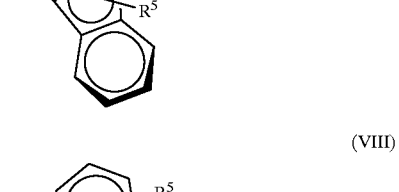   (VIII)

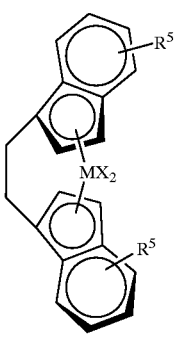

-continued

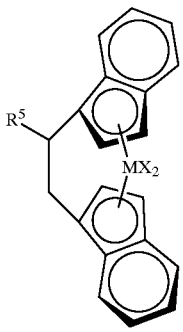
(IX)

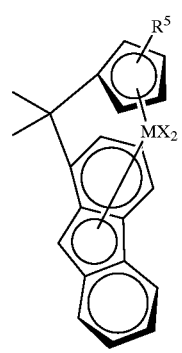
(X)

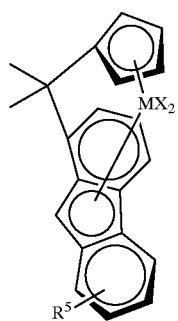
(XI)

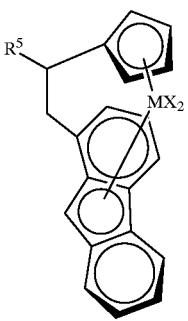
(XII)

wherein M and X have the same meanings as defined previously and $R^5$ is a $C_{5-20}$ alkyl group.

The introduction of long chain hydrocarbon substituents imparts many desirable properties to the metallocene catalyst, e.g., improved solubilities and high polymerization activities in an aliphatic hydrocarbon solvent, and easier activation due to improved interactions with cocatalysts.

Representative alkylaluminoxanes having a repeating unit of formula (II), which may be used in the present invention as a cocatalyst, have a linear, circular or reticular form and can be used alone or in combination thereof. Such representative alkylaluminoxanes include: methylaluminoxane, ethylaluminoxane, propylaluminoxane, butylaluminoxane, i-butylaluminoxane and the like.

Exemplary alkylaluminum of formula (III) which may be used in the present invention includes: trimethylaluminum, triethylaluminum, tripropylaluminum, triisopropylaluminum, tributylaluminum, triisobutylaluminum, triisoprenylaluminum the like.

The olefinic monomer which can be used in the present invention includes ethylene, α-olefin, cyclic olefin, dienes, trienes and the like. The preferred are ethylene, propylene, 1-butene, 1-pentene, 4-methyl-1-pentene, 1-hexene, 1-heptene, 1-octene, 1-nonene, 1-decene, cyclopentene, 1,3-cyclopentadiene, norbonene, norbonadiene, ethylidene norbonene, vinyl norbonene, dicyclopentadiene, 1,3-butadiene, 1,4-pentadiene, 1,5-hexadiene, styrene, α-methylstyrene, divinylbenzene, 3-chloromethylstyrene and the like. The monomer can also be copolymerized with one or more other monomers.

The preferred solvent which may be used in preparing the supported metallocene catalyst of the present invention includes a $C_{3-10}$ aliphatic hydrocarbon solvent, for example, propane, butane, isobutane, pentane, hexane, heptane, octane, nonane, decane and isomers thereof, and a mixture thereof.

The solid carrier which can be used in the present invention includes organic and inorganic materials. Representative inorganic carriers, which may be employed in the present invention, include: silica, alumina, silica-alumina, magnesia, titania, zirconia, talc, zeolite and the like. Illustrative compounds which may be used as the organic carrier include: polyethylene, polystyrene, polyvinyl alcohol, polyalkyl acrylate, dextrin and the like. Introduction of various reactive substituents and the amount thereof may vary with the desired structure and physical properties of the catalyst. In practicing the present invention, a mixture of two or more of the carriers may be used.

The catalyst which may be used in practicing the present invention is a metallocene compound obtained by introducing at least one $C_{5-20}$ alkyl substituent to the compound of formula (I) and it may be prepared by employing a conventional method, e.g., by a process which comprises: dissolving a metal salt (e.g., Na, K) of a $C_{5-3}$ ring compound containing a cyclopentadienyl moiety; adding a $C_{5-20}$ alkyl derivatives, e.g., a halide thereto to conduct a substitution reaction. The cyclopentadiene moiety having a $C_{5-20}$ substituent thus obtained can be used in preparing the catalyst of the present invention in accordance with the procedure described in *Organometallics*, 12, 2140(1993).

As mentioned above, various reactive substituents may be introduced into the support so that an alkylaluminoxane can be loaded thereonto more efficiently and the amount of such reactive substituent may be controlled depending on the amount of alkylaluminoxane to be loaded on the support. The inorganic carrier having reactive groups such as hydroxy groups on its surface may be heat-treated under a vacuum or under an atmospheric pressure of an inert gas such as nitrogen or argon. The heat-treatment temperature may be 1000° C. or less, preferably from 100° C. to 400° C.

Alternatively, to remove the surface hydroxy groups or impurities such as water and oxygen adsorbed on the surface of the solid carrier, the carrier may be treated with trimethylaluminum, triethylaluminum, tripropylaluminum, triisopropylaluminum, tributylaluminum, triisobutylaluminum, trimethyl chlorosilane, silane tetrachloride, various amine silane, zirconium tetrachloride, silanol trichloride, silandiol dichloride or the like.

In practicing the present invention, an alkylaluminoxane may be supported on a solid carrier as follows: At first, an alkylaluminum of formula (III) may be added onto a solid carrier having hydroxy groups on its surface, thereby forming alkylaluminoxane moieties on the surface of the carrier. Further, a supported cocatalyst may be prepared by stirring a carrier and an alkylaluminoxane in a suitable aliphatic hydrocarbon solvent, e.g., propane, butane, isobutane, pentane, hexane, heptane, octane, nonane, decane and a mixture thereof.

In practicing the present invention, polymerization may be carried out in accordance with any conventional method. For example, a desired amount of a supported catalyst suspended in an aliphatic solvent may be injected to a reactor containing a suitable amount of an inert organic solvent, thereby initiating the polymerization. The impurities contained in the solvent may be removed by using a small amount of alkylaluminum of formula(III), thereby preventing a decrease in activity.

The preparation of the supported catalyst comprising a metallocene compound and an alkylaluminoxane supported on an inert carrier in accordance with the present invention has the following advantages:

First, the process for the preparation of a supported catalyst is easier than those of the conventional supported catalyst; second, the unreacted metallocene remaining in the solution may be readily removed; third, only the metallocene bonded on the carrier participates in the polymerization, while free metallocene not bonded to the carrier does not participate in the polymerization; and finally, the supported catalyst of the present invention is stable, i.e., it does not dissociate during the course of the polymerization.

Further, polymerization using the supported catalyst of the present invention entails the following benefits:

The reaction rate is very high due to the high activity of the catalyst; the polymer produced has a high bulk density; reactor fouling does not occur; the catalyst activity does not decrease after a long term storage; the particle size of the polymer is uniform; and the molecular weight distribution of the polymer prepared by the catalyst of the present invention is similar to that prepared by a conventional homogeneous polymerization.

The following Examples are intended to illustrate the present invention more specifically, without limiting the scope of the invention.

The amount of aluminum incorporated into a catalyst was determined by inductively coupled plasma (ICP) analysis. The structures of catalysts synthesized were confirmed with 270 MHz FT-NMR(Jeol Co.). The molecular weight of a polymer was measured with High Temperature Gel Permeation Chromatography (GPC) (Waters 150 CV) using trichlorobenzene as an eluent at 140° C.

The polymer structure was analyzed with an NMR spectrophotometer (Bruker) by using perdeutero trichlorobenzene or a mixture of perdeutero trichlorobenzene and hexadeutero benzene.

The melting point ($T_m$) of a polymer was measured with a differential scanning calorimeter (DSC) by i) heating a sample of 3–4 mg to 180° C. at a rate of 5–10° C./min.; ii) cooling the sample to a room temperature at a rate of 5–50° C./min; iii) raising the sample temperature to 180° C. at a rate of 5–10° C./min; then measuring the melting point.

The bulk density of the polymer was measured according to the method disclosed in DIN 53 466 and ISO R 60 (Apparent Density Tester 1132, IPT(Institut für Pruftechnik) Co.). Density was measured in accordance with ASTM D 1505.

PREPARATION EXAMPLE 1

Synthesis of Catalyst

PREPARATION EXAMPLE 1–1: $(CH_3(CH_2)_7C_5H_4)_2ZrCl_2$

Under a high purity nitrogen atmosphere, 5.8 ml(30mmol) of 1-bromooctane was introduced into a Schlenck flask and 50 ml of tetrahydrofuran (THF) was added thereto. To the resulting mixture, 18 ml of 2N sodium cyclopentadienide in THF was added at 0° C. The resultant was stirred for 5 hours at room temperature, 100 ml of water and 100 ml of diethyl ether were added thereto, followed by agitation. The diethyl ether layer was separated and dried over anhydrous magnesium sulfate. After removing magnesium sulfate, the organic solvent was distilled off under a reduced pressure and the residue was subjected to silica gel column chromatography (eluent: hexane) to obtain 4.21 g of n-octylcyclopentadiene (yield: 79%).

Then, 4.21 g(23.6 mmol) of n-octylcylclopentadiene obtained above was transferred to a Schlenck flask and 40 ml of purified THF was added thereto under a high purity argon atmosphere. 9.4 ml of 2.5N n-butyl lithium(n-BuLi) was slowly added thereto at −78° C. The temperature of the resultant mixture was slowly elevated to room temperature and then stirred for additional 2 hours to obtain a ligand solution. 4.45 g of ditetrahydrofuran tetrachlorozirconium $(ZrCl_4(THF)_2)$ was added to a Schlenck flask under a nitrogen atmosphere in a dry box. After removing the flask from the dry box, 80 ml of purified toluene was added to the flask to obtain a slurry, to which the above ligand solution was added using a syringe while avoiding air contact. The mixture was stirred for 48 hours at 55° C. and the solvent was evaporated under a reduced pressure. The resulting solid product was recrystallized from a mixture of $CH_2Cl_2$ and hexane to obtain 7.31 g of purified bisoctylcyclopentadiene zirconium dichloride(yield: 60%).

NMR Analysis: 6.29(4H, t, J=2.43 Hz), 6.20(4H, t, J=2.43 Hz), 2.62(4H, t, J=7.83 Hz), 1.7–1.2(24H, m), 0.88(6H, t, J=6.4 Hz).

Preparation Example 1–2: $(CH_3(CH_2)_{11}C_5H_4)_2ZrCl_2$

The procedure of Preparation 1–1 was repeated except that 1-bromodocecane was used in place of 1-bromododecane to obtain $(CH_3(CH_2)_{11}C_5H_4)_2ZrCl_2$ (yield: 71%).

NMR Analysis: 6.28(4H, t, J=2.7 Hz), 6.20(4H, t, J=2.7 Hz), 2.62(4H, t, J=7.83 Hz), 1.7–1.1(44H, m), 0.88(6H, t, J=6.5 Hz).

Preparation Example 1–3: $(CH_3(CH_2)_{11}C_5H_4)_2ZrCl_2$

The procedure of Preparation 1–1 was repeated except that 1-bromodecane was used in place of 1-bromooctane to obtain $(CH_3(CH_2)_{11}C_5H_4)_2ZrCl_2$(yield: 70%).

NMR Analysis: 6.28(4H, t, J=2.7 Hz), 6.20(4H, t, J=2.7 Hz), 2.62(4H, t, J=7.83 Hz), 1.7–1.1(32H, m), 0.88(6H, t, J=6.5 Hz).

Preparation Example 1–4: $(CH_3(CH_2)_{15}C_5H_4)_2ZrCl_2$

The procedure of Preparation 1–1 was repeated except that 1-bromohexadecane was used in place of 1-bromooctane to obtain $(CH_3(CH_2)_{15}C_5H_4)_2ZrCl_2$(yield: 68%).

NMR Analysis: 6.28(4H, t, J=2.7 Hz), 6.20(4H, t, J=2.7 Hz), 2.61(4H, t, J=7.83 Hz), 1.6–1.1(56H, m), 0.88(6H, t, J=6.4 Hz).

Preparation Example 1–5: $(CH_3(CH_2)_5C_5H_4)_2ZrCl_2$

The procedure of Preparation 1–1 was repeated except that 1-bromohexane was used in place of 1-bromooctane to obtain $(CH_3(CH_2)_5C_5H_4)_2ZrCl_2$(yield: 76%).

NMR Analysis: 6.27(4H, t, J=2.7 Hz), 6.20(4H, t, J=2.7 Hz), 2.61(4H, t, J=7.83 Hz), 1.6–1.1(24H, m), 0.88(6H, t, J=6.4 Hz).

Preparation Example 2

Preparation of Supported Catalyst

Preparation Example 2-1

The temperature of 10 l reactor(Buchi Reactor) was adjusted to 15° C. and 6 l of hexane and 3.0 ml of trimethyl-aluminum (1.0 M in hexane) were injected thereto. 2 g of the metallocene catalyst prepared in Preparation 1-1 was brought into contact with 150 g of a supported cocatalyst(carrier: silica, MAO content: 23 wt %) in 250 ml of hexane and the resulting mixture was injected into the reactor and stirred for 5 minutes. Ethylene gas was introduced thereto at a rate of 1.0 l/min for 260 minutes to conduct prepolymerization. The resulting slurry was filtered to remove the solvent and unreacted catalyst and the solid was dried to obtain 470 g of a supported catalyst.

Preparation Example 2-2

2 mg of the metallocene catalyst prepared in Preparation 1-1 and 200 mg of supported cocatalyst(carrier: silica, MAO content: 23 wt %) were placed in a 250 ml reactor (Andrew Glass Reactor) under a high purity nitrogen atmosphere. 1.0 ml of trimethylaluminum (0.05M in hexane) and 100 ml of purified hexane were injected thereto and the resulting mixture was stirred slowly for 5 minutes. Prepolymerization was conducted by introducing ethylene at a rate of 50 ml/min for 40 minutes through a dip tube while maintaining the pressure of the reactor at below 1 psig. The resulting slurry was filtered to remove the solvent and the unreacted catalyst and the solid was dried to obtain 780 mg of a supported catalyst.

Preparation Examples 2-3 to 2-6

The procedure of Preparation 2-2 was repeated except that the metallocene catalysts prepared in Preparations 1-2 to 1-5 were used to obtain a series of supported catalysts.

Preparation 2-7

1 mg of the metallocene catalyst prepared in Preparation 1-1 and 100 mg of supported cocatalyst(carrier: silica, MAO content: 23 wt %) were placed in 250 ml reactor (Andrew Glass Reactor) under a high purity nitrogen atmosphere. 0.5 ml of trimethylaluminum(0.05M in hexane) and 100 ml of purified hexane were injected thereto, and the resulting mixture was stirred slowly for 10 minutes. After removing the solvent, the residue was dried to obtain a supported catalyst.

Preparations 2-8 and 2-9

The procedure of Preparation 2-7 was repeated except that the metallocene catalysts prepared in Preparations 1-2 and 1-3 were used to obtain a series of supported catalysts.

EXAMPLE 1

The temperature of a 2000 ml polymerization reactor (Autoclave Reactor) was adjusted to 75° C. and 700 ml of hexane and 8.0 ml of trimethylaluminum (0.5 M in hexane) were charged thereto. 200 mg of the supported catalyst obtained in Preparation 2-1 was suspended in 50 ml of hexane and introduced to the reactor. The mixture was stirred while introducing ethylene gas at 9 bar. The polymerization was carried out for 60 minutes to obtain 180 g of a polymer having a bulk density of 0.380 g/cm$^3$.

EXAMPLES 2 to 9

The procedure of Example 1 was repeated except that the supported catalysts prepared in Preparations 2-2 to 2-9 were used together with the trialkylaluminum shown in Table I.

The results are summarized in Table I.

EXAMPLE 10

The procedure of Example 1 was repeated except that the supported catalyst prepared in Preparation 2-1 was used after 90-day storage to obtain 182 g of a polymer having a bulk density of 0.370 g/cm$^3$.

The results are shown in Table I.

As shown from the Table I, the activity of the supported metallocene catalyst was maintained after 90-day storage.

EXAMPLE 11

600 ml of purified hexane and 8.0 ml of triethyl-aluminum (0.5 M in hexane) were charged to a 2000 ml polymerization reactor(Autoclave Reactor, temperature: 75° C.). 200 mg of the supported catalyst obtained in Preparation 2-1 was slurried in 100 ml of high purity hexane and stirred for 14 days at room temperature. Using the aged slurry, the procedure of Example 1 was repeated to provide 177 g of polymer having a bulk density of 0.373 g/cm$^3$.

The results are shown in Table I.

As shown from the Table I, the activity of the supported metallocene catalyst was maintained in a slurry form and the catalyst did not exhibit leaching phenomenon.

EXAMPLE 12

10 mg of the metallocene catalyst prepared in Preparation 1-1 and 300 mg of supported cocatalyst(carrier: silica, MAO content: 23 wt %) were added into a 250 ml reactor (Andrew glass reactor) under a high purity nitrogen atmosphere. 0.5 ml of trimethylaluminum(0.05M in hexane) and 100 ml of purified hexane were injected thereto. 50 ml of the resulting slurry was transferred to a glass flask while stirring over a period of 20 minutes. The prepolymerization was conducted in the reactor which contained remaining 50 ml of the slurry by introducing ethylene at a rate of 50 ml/min for 30 minutes through a dip tube while maintaining the pressure at below 1 psig. Each of the two batches of slurries, i.e., the prepolymerized slurry and the unreacted slurry was filtered under a nitrogen atmosphere to obtain two batches of solutions each amounting to about 45 ml of the solvent containing unreacted catalyst. ICP analysis showed that these solutions contained 0.076 and 0.077 mg Zr/ml hexane respectively.

700 ml of purified hexane and 8.0 ml of triethyl-aluminum (0.5 M in hexane) were placed in a 2000 ml polymerization reactor(Autoclave Reactor, temperature: 75° C.) 20 ml of each of the above solutions was injected thereto and the mixture was polymerized as in Example 1, but no polymer was produced in either case.

Next, the same polymerization runs were repeated except that in each runs, 2 ml of MAO(carrier: silica, 6.8 wt % of Al in toluene) was added as an additional component to the reactor. In these cases, polymers were obtained and their bulk densities were 0.05 and 0.08 g/cm$^3$, respectively.

EXAMPLE 13

Polymerization was carried out in a 240 l continuous polymerization reactor using the supported catalyst prepared in Preparation 1-1. The polymerization temperature ranged from 70 to 75° C. and hexane, i.e., the polymerization solvent was supplied to the polymerization reactor at a rate of 40 l/h while maintaining the amount of the hexane at 80% of the polymerization reactor volume. The concentration of triethylaluminum was maintained at 0.1 to 0.8 mM and ethylene was introduced at a rate of 5–8 Kg/h, while the supported catalyst was fed at a rate of 3–5 g/h. Small amounts of hydrogen and 1-butene were added to the ethylene feed stream in order to control the physical properties of the polymer. No reactor fouling was observed during a run period of 25 days.

The results are shown in Table II.

COMPARATIVE EXAMPLE 1

400 ml of hexane was placed in a 500 ml glass reactor together with a small amount of trimethylaluminum and 0.32 ml of methylaluminoxane solution(8.5 wt % Al). The reactor was placed in a 80° C. water bath and ethylene(2.7 bar) was introduced thereto with stirring, and then, the pressure of the reactor was reduced to ambient pressure. 0.1 mg of the metallocene catalyst prepared in Preparation 1-1 was dissolved in 1.0 ml of hexane and the resulting solution was injected into the reactor while increasing the ethylene pressure to 40 psig, and after 20 seconds, the polymerization was conducted by stirring the mixture for 1 hour to obtain a white polyethylene product. The product was precipitated in 500 ml of 5% HCl/methanol, washed with the same solution, filtered and dried at 60° C. for 24 hours under a vacuum. The peak molecular weight measured by gel permeation chromatography(solvent: trichlorobenzene of 140° C.) was 274,000 and the molecular weight distribution was 2.33.

The activity of the catalyst was 95 Kg(PE)/g(Zr).h and the bulk density the polymer obtained was 0.052 g/cm$^3$.

COMPARATIVE EXAMPLES 2 to 4

The procedure of Comparative Example 1 was repeated except that the catalyst and polymerization condition were varied as shown in Table III.

The results are shown in Table III.

COMPARATIVE EXAMPLE 5

The procedure of Comparative Example 1 was repeated except that 0.1 mg of biscyclopentadienylzirconium dichloride (($C_5H_5$)$_2$ZrCl$_2$) dissolved in 1 ml of toluene was employed, while substituting toluene for hexane as the polymerization solvent.

The results are shown in Table III.

COMPARATIVE EXAMPLE 6

The procedure of Comparative Example 5 was repeated except that the amount of biscyclopentadienylzirconium dichloride (($C_5H_5$)$_2$ZrCl$_2$) was varied as in Table III.

The results are shown in Table III.

COMPARATIVE EXAMPLES 7 to 9

The procedure of Comparative Example 1 was repeated except that the catalyst and polymerization condition were varied as shown in Table III, while using toluene as the polymerization solvent.

The results are shown in Table III. The polymers obtained were in the combined form of a fluff, mass and fiber and thus the bulk density thereof could not be measured.

TABLE I

| Ex. No. | Catalyst Prep. Ex. No. | Supported Catalyst Prep. Ex. No. | Prepolymerization* (%) | Amount (mg) | Alkylaluminum** Type | Amount (ml) | Activity*** Kg(PE)/g(cat) | Bulk Density g/cm$^3$ |
|---|---|---|---|---|---|---|---|---|
| 1 | 1-1 | 2-1 | 213 | 200 | TEA | 8.0 | 0.90 | 0.380 |
| 2 | 1-1 | 2-2 | 290 | 150 | TEA | 8.0 | 0.68 | 0.380 |
| 3 | 1-2 | 2-3 | 452 | 150 | TEA | 8.0 | 0.46 | 0.325 |
| 4 | 1-3 | 2-4 | 530 | 150 | TMA | 3.0 | 0.31 | 0.382 |
| 5 | 1-4 | 2-5 | 281 | 150 | TEA | 4.0 | 0.60 | 0.342 |
| 6 | 1-5 | 2-6 | 615 | 150 | TEA | 6.0 | 0.15 | 0.350 |
| 7 | 1-1 | 2-7 | 0 | 70 | TEA | 8.0 | 2.5 | 0.352 |
| 8 | 1-2 | 2-8 | 0 | 70 | TEA | 8.0 | 2.0 | 0.321 |
| 9 | 1-3 | 2-9 | 0 | 70 | TEA | 8.0 | 1.7 | 0.367 |
| 10 | 1-1 | 2-1 | 213 | 200 | TEA | 8.0 | 0.91[+] | 0.370 |
| 11 | 1-1 | 2-1 | 213 | 200 | TEA | 8.0 | 0.89[++] | 0.373 |

Polymerization condition: solvent: 700 ml of hexane, temperature: 75° C., ethylene pressure: 9 bar, polymerization time: 1 hour
*: ($W_a$—$W_b$)/$W_b$ × 100
$W_a$: weight of supported catalyst after prepolymerization
$W_b$: weight of supported catalyst before prepolymerization
**: TEA: triethylaluminum(0.5 mM in hexane)
TMA: trimethylaluminum(0.5 mM in hexane)
***: Activity = amount of produced polymer / amount of supported catalyst
[+]: The dried supported catalyst was used after storing for 90 days.
[++]: The dried supported catalyst was used after stirring in hexane for 14 days.

TABLE II

| Ethylene | Hydrogen* | 1-butene | Distribution of particle size(%) | | | Bulk Density | Density | Molecular weight | Molecular weight Distribution | $T_m$ (DSC) |
|---|---|---|---|---|---|---|---|---|---|---|
| Kg/h | % | g/l hexane | >850 μm | 850–53 μm | <53 μm | g/cm³ | g/cc | $M_w$ | $M_w/M_n$ | ° C. |
| 5 | 0 | 0 | 5.9 | 90.2 | 3.9 | 0.380 | 0.949 | 391,000 | 2.01 | 139.5 |
| 5 | 0.05 | 0 | 4.3 | 91.7 | 4.0 | 0.421 | 0.949 | 216,000 | 2.03 | 137.3 |
| 5 | 0.1 | 0 | 5.2 | 90.5 | 4.3 | 0.422 | 0.953 | 149,000 | 2.20 | 138.4 |
| 5 | 0.2 | 0 | 4.0 | 89.1 | 6.9 | 0.392 | 0.964 | 94,000 | 2.25 | 140.1 |
| 6 | 0 | 30 | 4.9 | 87.2 | 7.9 | 0.343 | 0.917 | 197,000 | 2.11 | 117.7 |
| 8 | 0 | 25 | 5.3 | 88.6 | 6.1 | 0.332 | 0.922 | 165,000 | 1.96 | 119.4 |
| 6 | 0 | 20 | 6.9 | 85.6 | 7.8 | 0.350 | 0.927 | 192,000 | 2.41 | 123.2 |
| 8 | 0.05 | 5 | 0.4 | 94.0 | 5.6 | 0.372 | 0.935 | 155,000 | 2.30 | 129.6 |

*: based on the weight of ethylene

TABLE III

| Comp. Ex. No. | Catalyst Preparation No. | Catalyst Amount (mg) | Cocatalyst[1] MAO (ml) | [Al]/[Zr] | Alkylatuminium Type | Alkylatuminium Amount (mmol) | Solvent Type | Solvent Amount (ml) | Ethylene Pressure (bar) | Polymerization Time min. |
|---|---|---|---|---|---|---|---|---|---|---|
| 1 | 1-1 | 0.1 | 0.32 | 5400 | TMA | 2.09 | hexane | 400 | 2.7 | 60 |
| 2 | 1-2 | 0.1 | 0.50 | 8900 | TMA | 2.09 | hexane | 700 | 4.0 | 60 |
| 3 | 1-4 | 0.128 | 0.50 | 10000 | TMA | 2.09 | hexane | 700 | 4.0 | 60 |
| 4 | 1-5 | 0.080 | 0.50 | 10000 | TMA | 2.09 | hexane | 700 | 4.0 | 60 |
| 5 | Cp₂ZrCl₂ | 0.1 | 0.32 | 3500 | TMA | 2.09 | hexane | 700 | 2.7 | 60 |
| 6 | Cp₂ZrCl₂ | 0.050 | 0.50 | 10000 | TMA | 2.09 | toluene | 200 | 4.0 | 60 |
| 7 | 1-4 | 0.128 | 0.50 | 10000 | TMA | 2.09 | toluene | 700 | 4.0 | 60 |
| 8 | 1-5 | 0.080 | 0.50 | 10000 | TMA | 2.09 | toluene | 700 | 4.0 | 60 |
| 9 | 1-1 | 0.090 | 0.50 | 10000 | TMA | 2.09 | toluene | 700 | 4.0 | 60 |

| Comp. Ex. No. | Activity Kg(PE)/mmol(Zr)·h | Bulk Density g/cc | Molecular weight (GPC) $M_{peak}$ | Molecular weight Distribution $M_w/M_n$ | $T_m$ (DSC) ° C. |
|---|---|---|---|---|---|
| 1 | 95 | 0.053 | 274,000 | 2.33 | 137 |
| 2 | 191 | 0.051 | 238,000 | 2.33 | 133 |
| 3 | 173 | 0.050 | 489,000 | 2.30 | 135 |
| 4 | 176 | 0.052 | 508,000 | 2.23 | 137 |
| 5 | 16 | 0.094 | 235,000 | 2.28 | 134 |
| 6 | 189 | 0.130 | 110,000 | 2.45 | 135 |
| 7 | 72 | N.D. | 674,000 | 2.03 | 139 |
| 8 | 119 | N.D. | 412,000 | 2.13 | 139 |
| 9 | 97 | N.D. | 293,000 | 2.31 | 136 | i: 8.5 wt of methylaluminoxane in toluene
N.D.: Not detected(see Comparative Examples 7 to 9)

As the above results show, olefinic polymers having a narrow molecular weight distribution and a high bulk density can be effectively prepared by the improved process of the present invention which uses a supported metallocene catalyst prepared by contacting the metallocene catalyst with a supported cocatalyst on a carrier in an aliphatic hydrocarbon solvent. Further, the supported metallocene catalyst can be prepared by a process comprising the steps of contacting the metallocene catalyst with a supported alkylaluminoxane in an aliphatic hydrocarbon solvent to obtain a slurry containing the supported catalyst of the present invention, optionally adding ethylene to the slurry to conduct prepolymerization and optionally isolating the supported catalyst, without further washing or drying step.

While the present invention has been described and illustrated with respect to the particular embodiments only, various changes and modifications may be made without departing from the scope and spirit of the present invention which is defined by the appended claims.

What is claimed is:

1. A process for preparing an olefinic polymer by polymerizing an olefinic monomer and, optionally, a comonomer in an aliphatic hydrocarbon solvent in the presence of a supported catalyst(s) comprising a modified metallocene(s) and an alkylaluminoxane(s) supported on a carrier prepared in the same aliphatic hydrocarbon solvent as employed in the olefin polymerization, the modified metallocene being derived from a metallocene of formula(I) by introducing at least one $C_{5-20}$ alkyl substituent into a π-ligand, $C_{1-4}$ alkylene bridge or silicon bridge thereof, to improve the solubility of the metallocene catalyst, and the alkylaluminoxane having a repeating unit of formula(II):

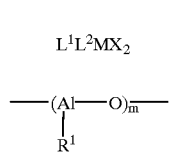 (I)

 (II)

wherein:

M is Ti, Zr or Hf;

X is a halogen, or a $C_{1-3}$ alkyl group;

$L^1$ and $L^2$ are each a π-ligand selected from the group consisting of cyclopentadienyl, indenyl, fluorenyl and derivatives thereof, and are optionally linked together by a $C_{1-4}$ alkylene bridge or by a silicon bridge;

m is an integer of 2 or more; and $R^1$ is a $C_{1-20}$ alkyl group.

2. The process of claim 1 wherein the supported catalyst is prepared by contacting the modified metallocene with the alkylaluminoxane supported on a carrier in an aliphatic hydrocarbon solvent to obtain a slurry and, optionally, isolating the supported catalyst.

3. The process of claim 1 wherein the supported catalyst is prepared by contacting the modified metallocene with the alkylaluminoxane supported on a carrier in an aliphatic hydrocarbon solvent to obtain a slurry, conducting prepolymerization of an olefinic monomer in the slurry and, optionally, isolating the supported catalyst.

4. The process of claim 1 wherein alkylaluminoxane, the carrier or the supported catalyst is treated with an alkylaluminum of formula(III):

 (III)

wherein $R^2$, $R^3$ and $R^4$ are each a $C_{1-20}$ alkyl group or a halogen.

5. The process of claim 1 wherein the carrier is selected from the group consisting of silica, alumina, silica-alumina, magnesia, titania, zirconia, talc, zeolite, polyethylene, polystyrene, polyvinyl alcohol, polyalkyl acrylate and dextrin.

6. The process of claim 1 wherein the aliphatic hydrocarbon solvent is selected from the group consisting of propane, butane, isobutane, pentane, hexane, heptane, nonane, decane and isomers thereof, and a mixture thereof.

7. The process of claim 1 wherein the monomer or the comonomer is selected from the group consisting of ethylene, α-olefins, cyclic olefins, dienes, trienes, styrenic monomers and a mixture thereof.

8. The process of claim 1 wherein the supported catalyst is prepared by contacting the modified metallocene with an alkylaluminum of formula(III), contacting the resulting mixture with the alkylaluminoxane supported on a carrier in an aliphatic hydrocarbon solvent to obtain a slurry, conducting prepolymerization of an olefinic monomer in the slurry and, optionally, isolating the supported catalyst:

 (III)

wherein $R^2$, $R^3$ and $R^4$ are each a $C_{1-20}$ alkyl group or a halogen.

* * * * *